United States Patent
He

(10) Patent No.: US 11,356,279 B2
(45) Date of Patent: Jun. 7, 2022

(54) BLOCKCHAIN-BASED ELECTRONIC SIGNATURE METHOD AND APPARATUS

(71) Applicant: Alipay (Hangzhou) Information Technology Co., Ltd., Zhejiang (CN)

(72) Inventor: Sanyuan He, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 17/360,324

(22) Filed: Jun. 28, 2021

(65) Prior Publication Data

US 2022/0052855 A1 Feb. 17, 2022

(30) Foreign Application Priority Data

Aug. 14, 2020 (CN) .......................... 202010817872.2

(51) Int. Cl.
*H04L 9/32* (2006.01)
*G06F 21/32* (2013.01)

(52) U.S. Cl.
CPC ............ *H04L 9/3247* (2013.01); *G06F 21/32* (2013.01); *H04L 9/321* (2013.01); *H04L 9/3231* (2013.01); *H04L 2209/38* (2013.01)

(58) Field of Classification Search
CPC ..... H04L 9/3247; H04L 9/321; H04L 9/3231; H04L 2209/38; G06F 21/32
See application file for complete search history.

(56) References Cited

U.S. PATENT DOCUMENTS

| 10,671,712 B1 | 6/2020 | Lindley et al. | |
| 2020/0067705 A1* | 2/2020 | Brown | H04L 9/3231 |
| 2020/0204370 A1* | 6/2020 | Wisniewski | H04L 9/0825 |

(Continued)

FOREIGN PATENT DOCUMENTS

| CN | 110968842 A | 4/2020 |
| CN | 111163154 A | 5/2020 |

(Continued)

OTHER PUBLICATIONS

Extended European Search Report in European Application No. 21182646.6, dated Dec. 13, 2021.

*Primary Examiner* — Christopher A Revak
(74) *Attorney, Agent, or Firm* — Finnegan, Henderson, Farabow, Garrett & Dunner, LLP

(57) ABSTRACT

A blockchain-based electronic signature method includes: receiving an electronic signature authentication request sent by an electronic signature client, wherein the electronic signature client is bound to one or more legal signature users, and the electronic signature authentication request includes biometric information of a signature user collected by the electronic signature client; in response to the electronic signature authentication request, authenticating whether the signature user is a legal signature user bound to the electronic signature client based on the biometric information; and if yes, returning an authentication result to the electronic signature client, so that the electronic signature client further prompts the signature user to perform an electronic signature operation in response to the authentication result; and receiving an electronic signature submitted by the signature user and collected by the electronic signature client, and publishing the electronic signature to a blockchain.

18 Claims, 7 Drawing Sheets

(56) References Cited

U.S. PATENT DOCUMENTS

| | | | |
|---|---|---|---|
| 2020/0258176 A1 | 8/2020 | Gibson et al. | |
| 2021/0105142 A1* | 4/2021 | Lee | H04L 9/3247 |
| 2021/0281421 A1* | 9/2021 | Semenovskiy | H04L 9/3247 |

FOREIGN PATENT DOCUMENTS

| | | |
|---|---|---|
| CN | 111355591 A | 6/2020 |
| CN | 111460499 A | 7/2020 |
| CN | 111460509 A | 7/2020 |
| CN | 111931152 A | 11/2020 |

* cited by examiner

BLOCKCHAIN-BASED ELECTRONIC SIGNATURE METHOD AND APPARATUS

CROSS-REFERENCE TO RELATED APPLICATIONS

The present application is based upon and claims priority to Chinese Patent Application No. 202010817872.2, filed on Aug. 14, 2020, the entire content of which is incorporated herein by reference.

TECHNICAL FIELD

The present specification relates to the field of computer applications, and in particular, to a blockchain-based electronic signature method and apparatus.

BACKGROUND

The blockchain technology, also referred to as a distributed ledger technology, is an emerging technology in which several computing devices participate in "book-keeping" and jointly maintain a complete distributed database. The blockchain technology has characteristics of decentralization, openness, and transparency, each computing device can participate in database recording, and rapid data synchronization can be performed between computing devices, so that the blockchain technology has been widely used in many fields.

SUMMARY

According to a first aspect of embodiments of the present specification, a blockchain-based electronic signature method, applied to a server, includes: receiving an electronic signature authentication request sent by an electronic signature client, wherein the electronic signature client is bound to one or more legal signature users, and the electronic signature authentication request includes biometric information of a signature user collected by the electronic signature client; in response to the electronic signature authentication request, authenticating whether the signature user is a legal signature user bound to the electronic signature client based on the biometric information; and if the signature user is a legal signature user bound to the electronic signature client, returning an authentication result to the electronic signature client, wherein the electronic signature client further prompts the signature user to perform an electronic signature operation in response to the authentication result; and receiving an electronic signature submitted by the signature user and collected by the electronic signature client, and publishing the electronic signature to a blockchain.

According to a second aspect of the embodiments of the present specification, a blockchain-based electronic signature method, applied to an electronic signature client to which one or more legal signature users are bound, includes: collecting biometric information of a signature user; sending an electronic signature authentication request carrying the biometric information to a server, wherein the server, in response to the electronic signature authentication request, authenticates whether the signature user is a legal signature user bound to the electronic signature client based on the biometric information; and if the signature user is a legal signature user bound to the electronic signature client, returns an authentication result to the electronic signature client; in response to the authentication result, further prompting the signature user to perform an electronic signature operation, and collecting an electronic signature submitted by the signature user; and sending the electronic signature to the server, for the server to publish the electronic signature to a blockchain.

According to a third aspect of embodiments of the present specification, a server includes: a processor; and a memory storing instructions executable by the processor, wherein the processor is configured to: receive an electronic signature authentication request sent by an electronic signature client, wherein the electronic signature client is bound to one or more legal signature users, and the electronic signature authentication request includes biometric information of a signature user collected by the electronic signature client; in response to the electronic signature authentication request, authenticate whether the signature user is a legal signature user bound to the electronic signature client based on the biometric information; and if the signature user is a legal signature user bound to the electronic signature client, return an authentication result to the electronic signature client, wherein the electronic signature client further prompts the signature user to perform an electronic signature operation in response to the authentication result; and receive an electronic signature submitted by the signature user and collected by the electronic signature client, and publish the electronic signature to a blockchain.

According to a fourth aspect of the embodiments of the present specification, an electronic signature client includes: a processor; and a memory storing instructions executable by the processor, wherein the processor is configured to: collect biometric information of a signature user; send an electronic signature authentication request carrying the biometric information to a server, wherein the server, in response to the electronic signature authentication request, authenticates whether the signature user is a legal signature user bound to the electronic signature client based on the biometric information; and if the signature user is a legal signature user bound to the electronic signature client, returns an authentication result to the electronic signature client; in response to the authentication result, further prompt the signature user to perform an electronic signature operation, and collect an electronic signature submitted by the signature user; and send the electronic signature to the server, for the server to publish the electronic signature to a blockchain.

In the above technical solutions, on the one hand, because the biometric information is used to verify the identity of the user participating in the signature before the electronic signature is performed, it may be guaranteed that the sent electronic signature comes from the user himself/herself, thus preventing the electronic signature from being stolen and counterfeited. On the other hand, the completed electronic signature is sent to the blockchain for deposit, and the blockchain has the characteristics of being open and transparent and difficult to tamper with; therefore, it may make it difficult for the user to deny the signature.

BRIEF DESCRIPTION OF THE DRAWINGS

The accompanying drawings are incorporated into the specification and constitute a part of the specification, illustrate embodiments consistent with the specification, and explain the principles together with the description of the specification.

DETAILED DESCRIPTION

Figure 1:
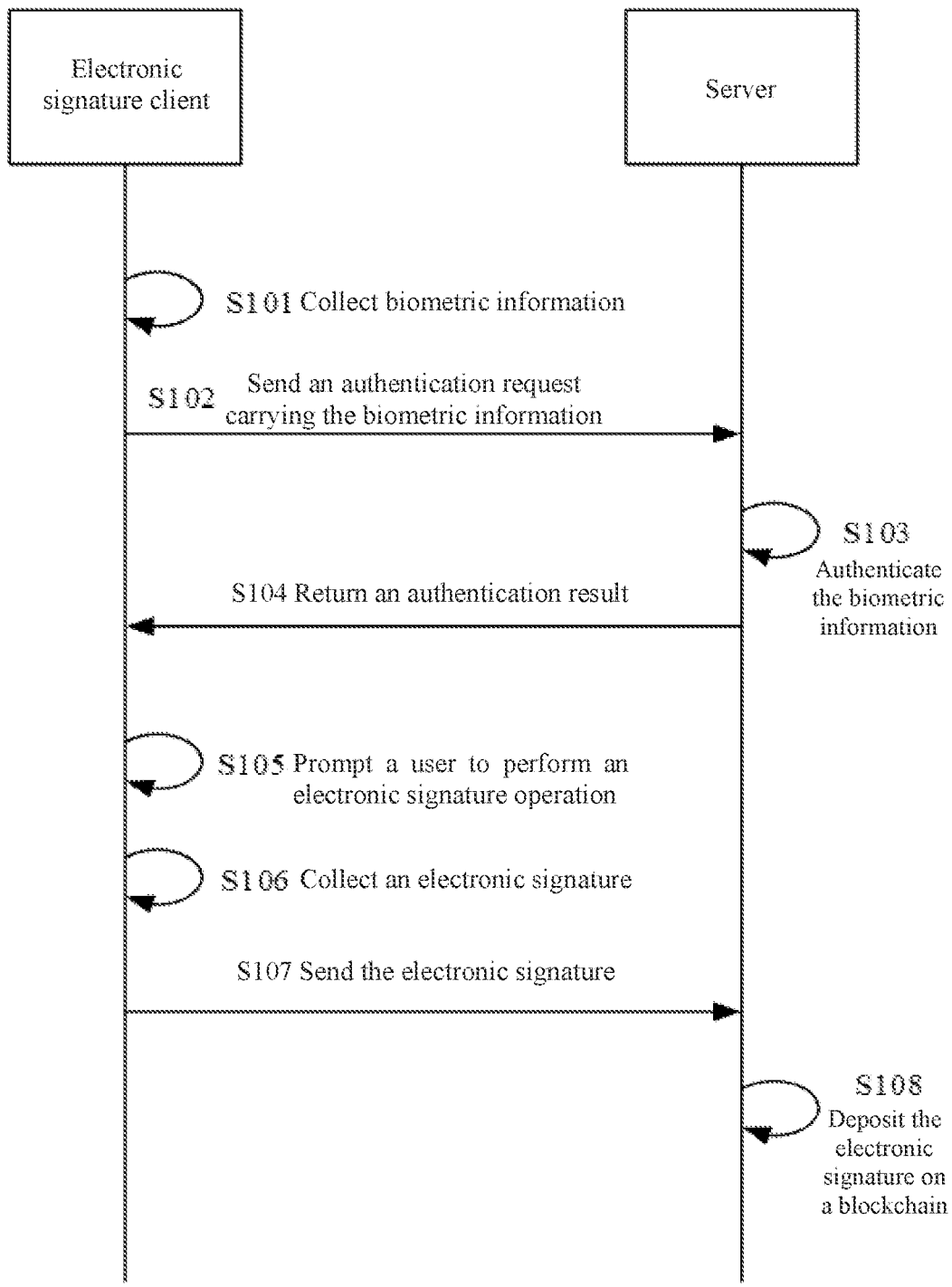
FIG. 1 is an interactive flowchart of a blockchain-based electronic signature method according to an embodiment.

Reference will now be made in detail to embodiments, examples of which are illustrated in the accompanying drawings. The following description refers to the accompanying drawings in which the same numbers in different drawings represent the same or similar elements unless otherwise represented. The described embodiments are merely some of rather than all the embodiments of the present application.

Terms used in the present specification are for the purpose of describing example embodiments only, and are not intended to limit the present specification. For example, although the terms "first," "second," and "third" may be used to describe various information in the present specification, the information should not be limited to these terms. These terms are only used to distinguish the same type of information from each other. For example, without departing from the scope of the present specification, first information may also be referred to as second information, and similarly, second information may also be referred to as first information. Depending on the context, the word "if" as used herein may be interpreted as "when" or "in response to determination."

In daily life, users often need to use signatures to confirm services when handling services. However, once a user's signature feature is stolen, there may be an error in which a signature of another person is also approved. This may further lead to decline in credibility of the signature, even a real signature user may deny a previous signature.

For example, when handling a network access service at a business hall of an Internet Service Provider (ISP), a user is usually required to sign his/her name on a client terminal such as a tablet or handwriting pad, or sign the name on a paper contract which is then scanned for storage, so as to confirm that the processing of the above network access service is approved by the user himself/herself. However, once user signatures are counterfeited or stolen by others, it may cause losses to users and merchants. Moreover, since the signatures may be counterfeited, the credibility of the signatures may decline, and some users may deny previous signatures with the excuse that the signatures are stolen by others, and this may further cause the loss of merchants' interests.

In view of the above, embodiments of the present specification provide an electronic signature method that can make it difficult for users to deny their signatures and for the signatures to be stolen or counterfeited. In the method, identity of a signature user is authenticated with the aid of the biometric technology, an electronic signature is performed after the authentication succeeds, and the completed signature is published to a blockchain for deposit.

For example, a legal signature user may be bound to an electronic signature client in advance, and store the user's own biometric information and the binding relationship on a server, so that the identity of the signature user is authenticated through the biometric information in the subsequent process. After the signature is completed, a collected electronic signature may be published to a blockchain through the server to complete deposit.

In the above solution, on the one hand, the signature user must succeed in identity authentication before signing. If the signature user is not a user who is bound to the electronic signature client used, the user will be failed in the biometric information authentication, and therefore cannot perform the signature action. Therefore, the electronic signature in the above solution is difficult to be counterfeited or stolen. On the other hand, the completed electronic signature is published to the blockchain for deposit, and the blockchain itself has the characteristics of being decentralized, open, and transparent, and difficult to tamper with. Therefore, the electronic signature in the above solution cannot be denied once it is signed.

The blockchain is a data structure that can be used for deposit, and is generally classified into three types: public blockchain, private blockchain, and consortium blockchain. In addition, there may also be a combination of the above types, for example, private blockchain+consortium blockchain, consortium blockchain+public blockchain, and the like.

The public blockchain is most decentralized among the different types. The public blockchain is represented by Bitcoin and Ethereum. Participants who join the public blockchain (also referred to as nodes in the blockchain) can read data records on the blockchain, participate in transactions, compete for book-keeping rights of new blocks, and the like. Moreover, each node can freely join or exit the network and perform related operations.

The private blockchain is the opposite. A write permission of the network is controlled by an organization or institution, and a data read permission is regulated by the organization. In simple terms, a private blockchain may be a weakly centralized system with strict restrictions on nodes and a small number of nodes. This type of blockchain is more suitable for internal use by a specific institution.

The consortium blockchain is a blockchain between the public blockchain and the private blockchain, which may achieve "partial decentralization." Each node in the consortium blockchain usually has a corresponding entity or organization. The nodes are authorized to join the network and form an interests-related consortium to jointly maintain the operation of the blockchain.

Based on basic characteristics of the blockchain, a blockchain is usually composed of blocks. Timestamps corresponding to creation time of blocks are recorded in these blocks respectively, and all the blocks follow the timestamps recorded in the blocks to form a time-ordered data chain.

For real data generated in the physical world, it may be constructed into a standard transaction format supported by a blockchain, and then published to the blockchain. Node devices in the blockchain perform consensus processing on the received transaction, and after a consensus is reached, a node device serving as a book-keeping node in the blockchain packages the transaction into the block and performs persistent deposit in the blockchain.

Consensus algorithms supported in the blockchain may include, e.g., a first type of consensus algorithm, that is, a consensus algorithm that node devices need to compete for the book-keeping right of each round of book-keeping cycle, such as Proof of Work (POW), Proof of Stake (POS), and Delegated Proof of Stake (DPOS) consensus algorithms; and a second type of consensus algorithm, that is, a consensus algorithm that pre-selects a book-keeping node for each round of book-keeping cycle (without the need of competing for the book-keeping right), such as Practical Byzantine Fault Tolerance (PBFT) consensus algorithm.

In the blockchain network using the first type of consensus algorithm, all node devices that compete for the book-keeping right may execute a transaction after receiving the transaction. One of the node devices competing for the book-keeping right may win in this round and become the book-keeping node. The book-keeping node may package the received transaction together with other transactions to generate the latest block, and send the generated latest block or a block header of the latest block to other node devices for consensus.

In the blockchain network using the second type of consensus algorithm, a node device with the book-keeping right has been agreed before this round of book-keeping. Therefore, after a node device receives a transaction, if it is not the book-keeping node of this round, it may send the transaction to the book-keeping node. For the book-keeping node of this round, the transaction may be executed during or before the process of packaging the transaction together with other transactions to generate the latest block. After the latest block is generated, the book-keeping node may send the latest block or a block header of the latest block to other node devices for consensus.

Regardless of the consensus algorithm adopted by the blockchain, the book-keeping node of this round can package the received transaction to generate the latest block, and send the generated latest block or a block header of the latest block to other node devices for consensus verification. After the latest block or the block header of the latest block is received, if it is verified by the other node device that there is no problem, the latest block may be appended to the end of the original blockchain to complete the book-keeping process of the blockchain. In the process of verifying a new block or block header sent by the book-keeping node, other nodes may also execute the transaction contained in the block.

Accordingly, publishing the electronic signature completed by the signature user to the blockchain may achieve the effect of public and persistent deposit.

FIG. 1 is an interactive flowchart of a blockchain-based electronic signature method according to an embodiment. Before FIG. 1 is described, the blockchain-based electronic signature method is described from a server side and a client side in FIG. 2 and FIG. 3, respectively.

Figure 2:
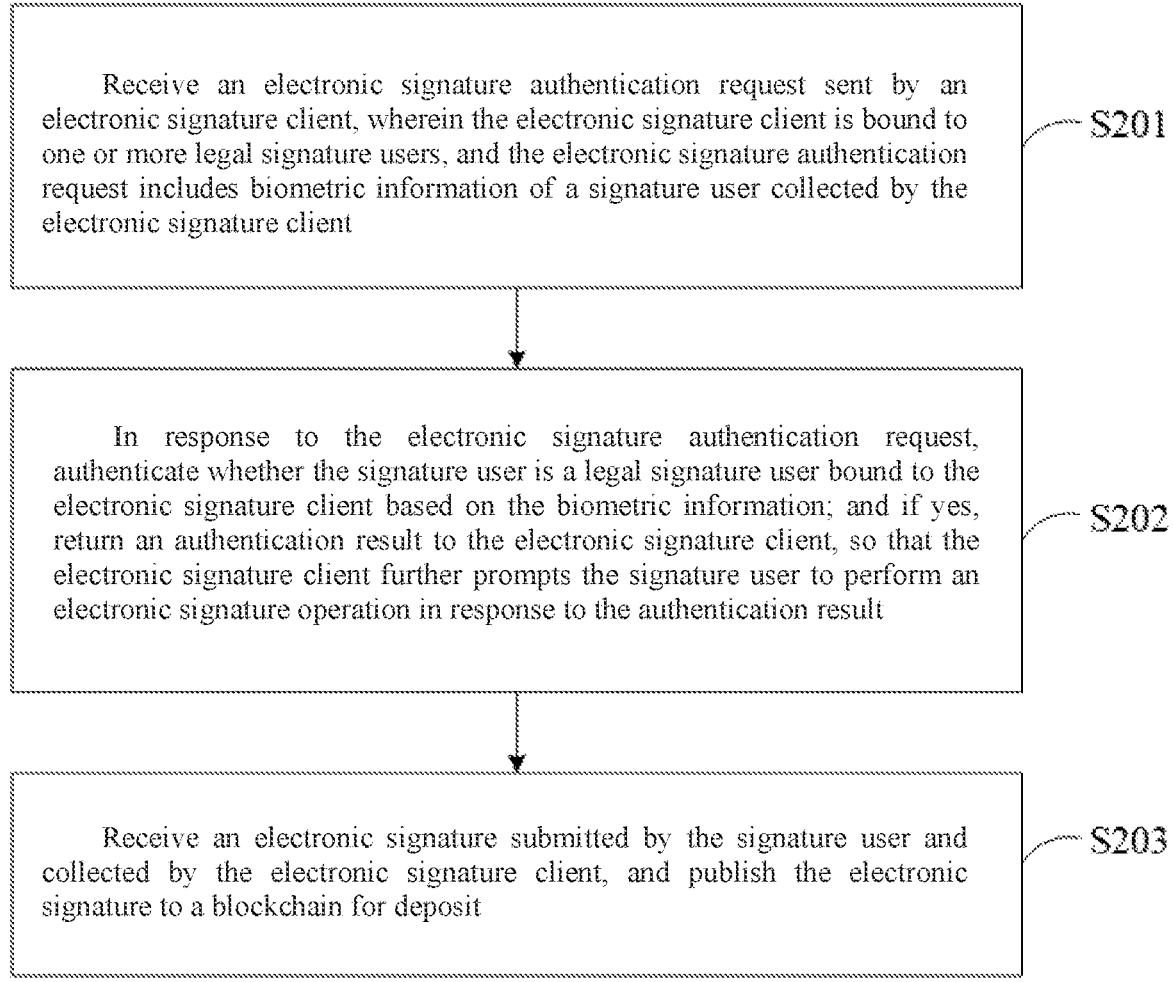
FIG. 2 is a flowchart of a blockchain-based electronic signature method according to an embodiment.

FIG. 2 is a flowchart of a blockchain-based electronic signature method at a server side, according to an embodiment. The method may include the following steps.

In S201, an electronic signature authentication request sent by an electronic signature client is received, wherein the electronic signature client is bound to one or more legal signature users, and the electronic signature authentication request includes biometric information of a signature user collected by the electronic signature client.

In S202, in response to the electronic signature authentication request, whether the signature user is a legal signature user bound to the electronic signature client is authenticated based on the biometric information; and if yes, an authentication result is returned to the electronic signature client, so that the electronic signature client further prompts the signature user to perform an electronic signature operation in response to the authentication result.

In S203, an electronic signature submitted by the signature user and collected by the electronic signature client is received, and the electronic signature is published to a blockchain for deposit.

The above biometric information may include any information that can reflect inherent physiological characteristics and/or behavioral features of a human body and can be used for identity recognition. It may include image information such as a fingerprint, an iris, and a face, may also include voice information, gait information, and the like, and may also include a combination of the above multiple types of biometric information, and the like. Therefore, the type of biometric information to be used does not need to be specifically limited in the present specification, and those skilled in the art may choose the biometric information to be used by themselves according to specific requirements.

In an embodiment, the above biometric information may include a facial image. For example, the image may be a static single frame image, or may be a multi-frame image or even a video. The multi-frame image or video carries more information, and therefore, the above biometric information may be made more reliable.

The above electronic signature includes any information that may be stored in a computer, can identify the identity of a user, and is used to indicate the corresponding user's confirmation of something. For example, the signature may include a name or a preset text such as "Read" and "Agreed" of the user presented in handwriting. Also for example, the signature may include a seal, encryption hardware, a password private key, a dynamic password, and the like unique to the user. For example, the user's imprint on a contract with a company's official seal may also be regarded as a special form of signature, and the imprint is recorded in a computer system by scanning, photographing, and the like, which may be regarded as an electronic signature.

The above electronic signature client may include any device or software that can interact with a signature user so that the signature user can use it to enter a signature and has the function of collecting biometric information. For example, the electronic signature client may be a tablet computer with a front camera and a touch screen that can acquire a facial image of a signature user by the camera as biometric information, and can also collect a signature handwriting written by the user by touching the touch screen.

For another example, the electronic signature client may be a device installed with an application (APP) with a human voice collection function and a signature scanning function. The APP can collect the user's speech as biometric information through its human voice collection function, and can also scan an image of a paper signature to complete entering of the user signature.

The above server may include any form of server that can provide functions such as sending and receiving, authentication, and storage involved in the above solution. It may be a specific server, a server cluster, or a distributed cloud server. The specific implementation is not specifically limited in the present specification.

The above blockchain may include any form of blockchain, either a public blockchain, a private blockchain, or a consortium blockchain. Since different types of blockchains have different advantages and disadvantages, those skilled in the art may choose the blockchain according to their specific needs.

Figure 3:
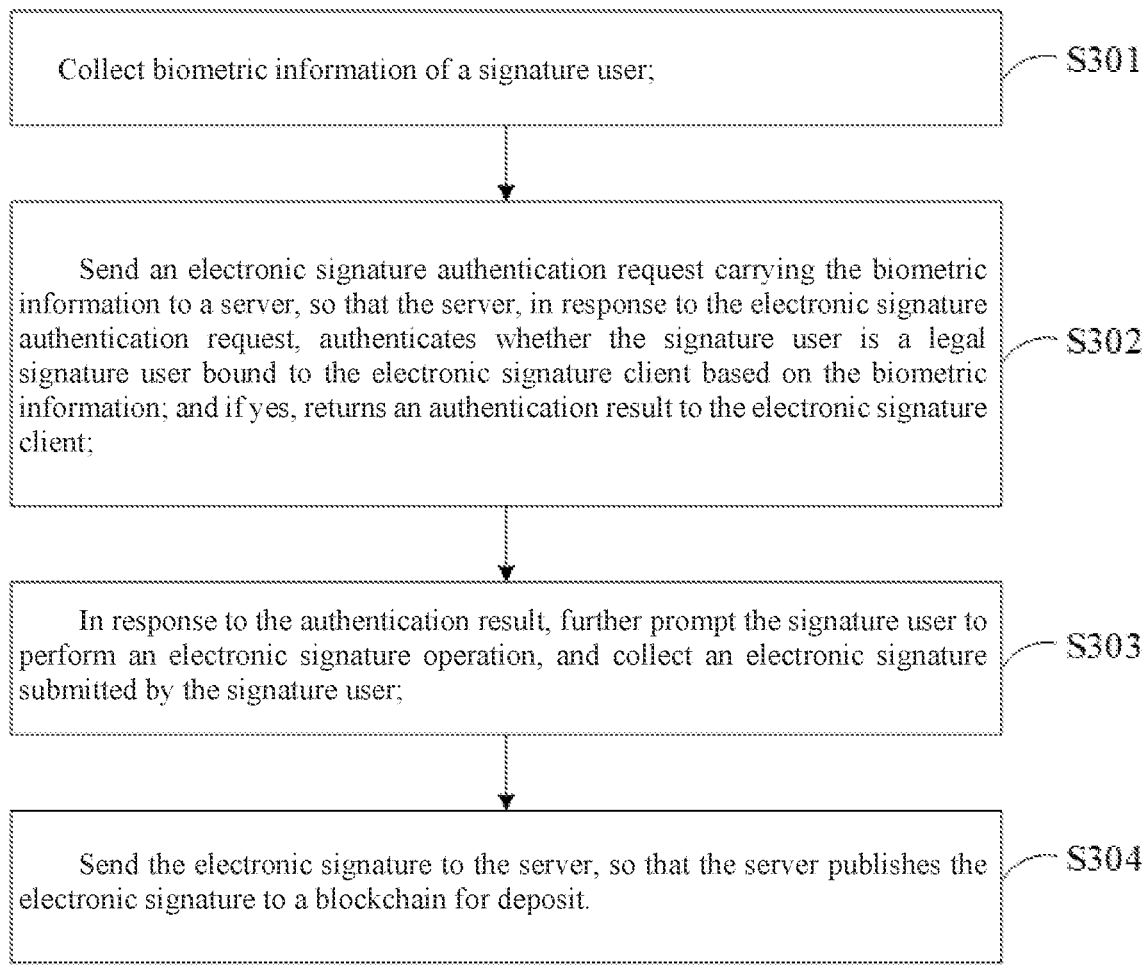
FIG. 3 is a flowchart of a blockchain-based electronic signature method according to an embodiment.

FIG. 3 is a flowchart of a blockchain-based electronic signature method at a client side, according to an embodiment. The method may include the following steps.

In S301, biometric information of a signature user is collected.

In S302, an electronic signature authentication request carrying the biometric information is sent to a server, so that the server, in response to the electronic signature authentication request, authenticates whether the signature user is a legal signature user bound to the electronic signature client based on the biometric information; and if yes, returns an authentication result to the electronic signature client.

In S303, in response to the authentication result, the signature user is further prompted to perform an electronic signature operation, and an electronic signature submitted by the signature user is collected.

In S304, the electronic signature is sent to the server, so that the server publishes the electronic signature to a blockchain for deposit.

FIG. 1 is an interactive flowchart of a blockchain-based electronic signature method according to an embodiment. The electronic signature method may include two parts: an authentication stage and a signature stage. The authentication stage may include the following steps.

In S101, biometric information is collected.

For example, the electronic signature client may first collect biometric information of a signature user. The method of collection may vary according to different types of biometric information. For example, in the case of using a facial image as the biometric information, the collection of a facial image of the signature user may be completed by invoking a camera. In the case of using voice record as the biometric information, the collection of a voice signal of the signature user may be completed by invoking a microphone. The specific method used to collect the above biometric information is not limited in the present specification.

In S102, an authentication request carrying the biometric information is sent.

For example, after the biometric information is collected, the electronic signature client may send an authentication request carrying the biometric information to the server to request the server to perform subsequent operations based on the biometric information. The authentication request is not limited to a single message or request, and may also include a group of messages that complete the above functions. For example, the authentication request and the biometric information are encapsulated in two or more messages respectively, and the two or more messages as a whole are regarded as an authentication request carrying the biometric information.

In S103, the biometric information is authenticated.

For example, the electronic signature client may be bound to one or more legal signature users in advance, and store the above binding relationships. The electronic signature client may declare its own identity, that is, an identifier of the electronic signature client, to the server in the process of information exchange with the server, which may be reflected in any step of the information exchange, or client identity confirmation information may be sent separately, which is not limited in the present specification.

If the identity of the electronic signature client is known, the legal signature user having a binding relationship with it may be found correspondingly. Further, according to the biometric information carried in the authentication request sent by the electronic signature client, it may be determined whether the user indicated by the biometric information carried in the authentication request, that is, the signature user, is a legal signature user bound to the electronic signature client.

In an embodiment, the biometric information carried in the authentication request sent by the above electronic signature client may be matched with biometric information of a legal signature user bound to the above electronic signature client that is pre-stored in the server; and if the matching succeeds, it may be determined that the signature user is the legal signature user bound to the electronic signature client. In another embodiment, the biometric information of the legal signature user may also be stored in another location, and the above task of determining whether the signature user is a legal signature user may be completed indirectly.

In an embodiment, a biometric information database may be preset in the server, and the identity of the signature user may be determined by searching the biometric information database for the biometric information carried in the authentication request, which may be further combined with the above binding relationship between the legal signature user and the electronic signature client to complete the determination on whether the signature user is a legal signature user bound to the electronic signature client.

In S104, an authentication result is returned.

For example, if the authentication result is yes, the server may return the authentication result to the electronic signature client. The authentication result may be in plain text, or encrypted or encoded. For example, if agreed in advance, and if the authentication result is yes, return information may carry corresponding return code, as the authentication result. Those skilled in the art can determine the specifically used communication protocol and the used status code to indicate different meanings according to specific needs, which is not limited in the present specification.

The authentication stage ends after S104 is performed. Through the authentication stage, it is ensured that only when the signature user succeeds in the authentication, that is, the signature user is indeed a legal signature user bound to the electronic signature client, the subsequent signature stage may be entered, thus ensuring that the electronic signature cannot be counterfeited or stolen.

In an embodiment, the electronic signature client may be bound to multiple legal signature users, so that multiple persons may share a device or authorized signature may be performed. For example, a legal signature user A with a disability on both hands can authorize user B to become a legal signature user of the electronic signature client that has been bound to user A, so that user B can succeed in the above biometric information authentication, and then complete the subsequent signature action.

The signature stage after the authentication stage may include the following steps.

In S105, the user is prompted to perform an electronic signature operation.

For example, the electronic signature client may prompt the signature user to perform an electronic signature operation in response to the authentication result. The prompt method may include one or more of the following manners such as a text field, a picture, a pop-up window, a notification, and a prompt sound.

In S106, an electronic signature is collected.

For example, the electronic signature client may collect the electronic signature submitted by the user. The collection means of the electronic signature may correspond to the form and characteristics of the electronic signature itself. For example, if the handwriting of a handwritten name is used as the electronic signature, a touch screen or a stylus/screen may be used as an input device, or a camera may is invoked to complete entering of the signature handwriting on a paper document. If a USB hardware key is used as the electronic signature, a corresponding USB communication module may complete the electronic signature collection.

In S107, the electronic signature is sent.

For example, after the electronic signature client collects the electronic signature submitted by the signature user, it may send the electronic signature to the server.

In S108, the electronic signature is deposited on a blockchain.

For example, after the server receives the electronic signature from the electronic signature client, it may publish the electronic signature to the blockchain for deposit. For example, the server may be directly used as an on-blockchain node of the blockchain to broadcast a corresponding deposit transaction in the blockchain, and may also indirectly complete the publishing and depositing steps by communicating with the node on the blockchain.

Because the blockchain itself has the characteristics of being open, transparent, and difficult to tamper with, as long as the signature user submits the electronic signature through the above method, deposit information in the corresponding blockchain may become a credible evidence proving that the electronic signature does exist. Therefore, it is difficult for the user to deny the previously submitted electronic signature. Moreover, only the legal signature user can submit the electronic signature, so the user cannot deny the identity of the submitter of the electronic signature. Therefore, compared with related art, the electronic signature in the embodiments has higher credibility.

In an embodiment, the legal signature user may be pre-bound to the electronic signature client for subsequent use. For example, the electronic signature client may send a binding request of the legal signature user to the server, and the binding request may carry the collected biometric information of a user to be bound and its identity identifier, so that the server can verify the identity identifier and biometric information of the user to be bound to determine whether the two indicate the same natural person. If yes, the biometric information may be bound to the electronic signature client, and the binding relationship may be stored.

Through the above solution, it may be ensured that the biometric information submitted by the user bound to the electronic signature client matches the user, so that the problem of stealing the identity or biometric information of others for maliciously binding may be avoided.

In the above process of determining whether the biometric information of the user to be bound and the identity identifier of the user to be bound indicate the same natural person, when the server is preset with a database that can be used to query the correspondence between the biometric information and the identity identifier, the process may be directly completed by the server. In other cases, the process may also be completed indirectly through a third-party certification authority.

In an embodiment, the server may send a verification request to the third-party certification authority, the verification request carrying the biometric information and the identity identifier of the user to be bound, so that the third-party certification authority, in response to the verification request, may inquiry biometric information corresponding to the identity identifier, and after the biometric information of the user to be bound is matched with the biometric information obtained by the inquiry, return a result of the matching. After that, it can be determined, according to the result of the matching, whether the biometric information of the user to be bound and the identity identifier of the user to be bound indicate the same natural person.

The third-party certification authority in the above example may be a public security network, or another service provider that can provide a service for inquiring correspondences between biometric information and identity identifiers.

In an embodiment, before the biometric information is authenticated, the electronic signature client or server may use liveness detection to ensure that the signature user is a real alive user. The liveness detection may include a dynamic detection focusing on responses of a signature user, and a static detection focusing on biometric information itself.

For example, the biometric information is preset as a facial image in the form of a video, then, each time the biometric information is collected, a randomly generated password may be output to the user, and the user may be asked to read the password, so that a captured video will contain mouth shape change information when the user reads the password. If the mouth shape change information matches the above randomly generated password, it is determined that the user succeeds in the liveness recognition.

The above detection process may be attributed to dynamic detection that focuses on user interaction and participation. Based on this idea, those skilled in the art can apply relevant technical means to design other forms of dynamic liveness detection methods, which are not limited in the present specification.

For another example, the collected facial image may be compared with existing facial images on the Internet, or it may be determined whether the collected facial image is an existing image through watermark checking, thereby determining whether the user is an alive user. For example, if a watermark is found on the collected facial image, it may be determined that the facial image is an existing image instead of a facial image captured in real time, which proves that the user is not an alive user. If the collected facial image is the same as the existing facial image on the Internet, it may be determined that the facial image is not a facial image taken in real time, which also proves that the user is not an alive user. The specific algorithms for judging the watermark and identical images may be obtained with reference to relevant technical literature, which do not need to be repeated in the present specification.

The above detection process may be attributed to static detection that focuses on biometric information itself. Based on this idea, those skilled in the art may apply relevant technical means to design other forms of static liveness detection methods to be applicable to biometric information in various forms, which is not limited in the present specification.

Applying the above liveness detection method can ensure that the signature user is a real alive user, thereby ensuring that the collected biometric information is submitted by a real alive user, and to a certain extent avoiding the problem that some users fool the biometric recognition mechanism by stealing biometric information such as pictures and fingerprints of others.

In an embodiment, after receiving the above binding request, the server may detect whether the binding request is a network attack, thereby shielding the network attack and improving the security of the server. Common network attacks may include repeated requests, invalid requests, and the like with a quantity that exceeds a threshold. A corresponding detection method may be a blacklist-based or feature-based detection.

For example, within a preset period of time, if the quantity of binding requests issued by an IP address exceeds a preset threshold, it can be determined that the IP is launching a network attack on the server, and the IP is placed in the blacklist. When a binding request from the IP is received subsequently, it may be blocked directly.

For another example, if it is known that a certain type of network attack will contain a specific field, the field may be added to the above feature database in advance, and subsequently, once it is found that the binding request contains this field, the binding request may be determined as a network attack and then blocked.

In an embodiment, the electronic signature client may add other information to the electronic signature before sending the electronic signature to the server. The specific method of addition may be repackaging the other information to generate a new electronic signature. The above information may also be embedded in an electronic signature by means of digital watermarking, etc.

In an embodiment, the electronic signature may also include a signature moment and/or recognized signature content. The information is added to the electronic signature and participates in subsequent deposit. Then, when inquiring is needed, the above signature moment and/or the recognized signature content may be found as well by querying the electronic signature, which facilitates realization of functions such as information statistics and verification.

In an embodiment, the electronic signature is published to the blockchain for deposit. The electronic signature may be directly stored in a distributed database of the blockchain. Alternatively, the electronic signature may be hashed, and the obtained hash value is stored only in the distributed database of the blockchain. For example, plaintext storage is convenient to increase transparency and facilitates publicity and supervision, but it may cause a waste of resources on the blockchain; however, storing the hash value may also meet the functional requirements of deposit, but the original text cannot be directly obtained. In order to realize the inquiry for the original electronic signature, an off-chain database storing the original text of the original electronic signature may be used cooperatively.

In an embodiment, the process of publishing the electronic signature to the blockchain for deposit may include hashing the electronic signature, and publishing the obtained hash value of the electronic signature to the blockchain for deposit.

In an embodiment, the process of publishing the electronic signature to the blockchain for deposit may include encrypting the electronic signature, and publishing the encrypted electronic signature to the blockchain for deposit.

Corresponding to the blockchain-based electronic signature methods, blockchain-based electronic signature apparatuses are also provided in the present specification, which are applied to the server and the electronic signature client, respectively.

Figure 4:
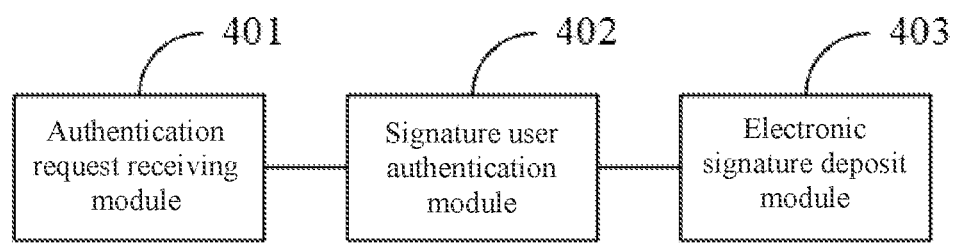
FIG. 4 is a schematic diagram of a blockchain-based electronic signature apparatus according to an embodiment.

FIG. 4 is a schematic diagram of a blockchain-based electronic signature apparatus applied to a server, according to an embodiment. The apparatus includes an authentication request receiving module 401, a signature user authentication module 402, and an electronic signature deposit module 403.

The authentication request receiving module 401 is configured to receive an electronic signature authentication request sent by an electronic signature client, wherein the electronic signature client is bound to one or more legal signature users, and the electronic signature authentication request includes biometric information of a signature user collected by the electronic signature client.

The signature user authentication module 402 is configured to, in response to the electronic signature authentication request, authenticate whether the signature user is a legal signature user bound to the electronic signature client based on the biometric information; and if yes, return an authentication result to the electronic signature client, so that the electronic signature client further prompts the signature user to perform an electronic signature operation in response to the authentication result.

The electronic signature deposit module 403 is configured to receive an electronic signature submitted by the signature user and collected by the electronic signature client, and publish the electronic signature to a blockchain for deposit.

In an embodiment, the apparatus may further include a binding request receiving module and a first binding module.

The binding request receiving module may be configured to receive a binding request of the legal signature user sent by the electronic signature client, wherein the binding request may include an identity identifier of a user to be bound and biometric information of the user to be bound collected by the electronic signature client.

The above first binding module may be configured to, in response to the binding request, determine whether the biometric information of the user to be bound and the identity identifier of the user to be bound indicate the same natural person; and if the same natural person is indicated, bind the biometric information of the user to be bound to the electronic signature client, and store a binding relationship.

In an embodiment, the first binding module may further send a verification request to a third-party certification authority, the verification request carrying the biometric information and the identity identifier of the user to be bound, so that the third-party certification authority, in response to the verification request, inquires biometric information corresponding to the identity identifier, and after the biometric information of the user to be bound is matched with the biometric information obtained by the inquiry, returns a result of the matching. After that, it can be determined, according to the result of the matching, whether the biometric information of the user to be bound and the identity identifier of the user to be bound indicate the same natural person. The third-party certification authority in the above example may be a public security network, or another service provider that can provide a service for inquiring correspondences between biometric information and identity identifiers.

In an embodiment, a biometric information sample of a legal signature user bound to the electronic signature client is stored in the server. The signature user authentication module 402 may further match the above biometric information with the biometric information sample stored in the server; and if the matching succeeds, the above signature user may be determined as the legal signature user bound to the electronic signature client.

In an embodiment, the biometric information may be a facial image.

In an embodiment, the electronic signature may include a signature handwriting of the user.

In an embodiment, the electronic signature may further include a signature moment and/or recognized signature content.

Figure 5:
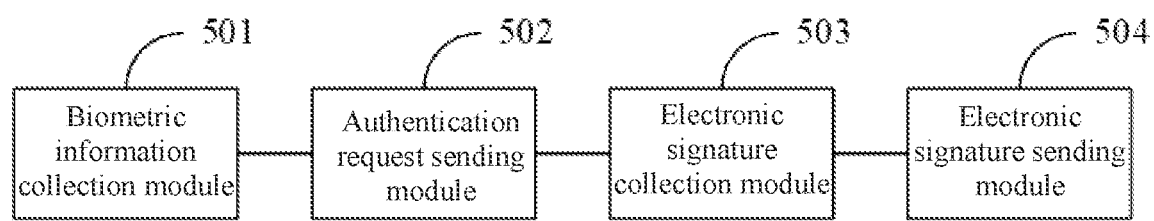
FIG. 5 is a schematic diagram of a blockchain-based electronic signature apparatus according to an embodiment.

FIG. 5 is a schematic diagram of a blockchain-based electronic signature apparatus applied to an electronic signature client, according to an embodiment. The electronic signature client is bound to one or more legal signature users. The apparatus includes a biometric information collection module 501, an authentication request sending module 502, an electronic signature collection module 503, and an electronic signature sending module 504.

The biometric information collection module 501 is configured to collect biometric information of a signature user.

The authentication request sending module 502 is configured to send an electronic signature authentication request carrying the biometric information to a server, so that the server, in response to the electronic signature authentication request, authenticates whether the signature user is a legal signature user bound to the electronic signature client based on the biometric information; and if yes, returns an authentication result to the electronic signature client.

The electronic signature collection module 503 is configured to, in response to the authentication result, further prompt the signature user to perform an electronic signature operation, and collect an electronic signature submitted by the signature user.

The electronic signature sending module 504 is configured to send the electronic signature to the server, so that the server publishes the electronic signature to a blockchain for deposit.

In an embodiment, the process of authenticating, based on the above biometric information, whether the above signature user is a legal signature user bound to the above electronic signature client may include matching the biometric information with the biometric information sample stored in the server; and if the matching succeeds, determining the signature user as the legal signature user bound to the electronic signature client.

In an embodiment, the apparatus may further include a second binding module. The module may first collect biometric information of a user to be bound, and acquire identity identifier of the user to be bound; send a binding request of a legal signature user to the server, the binding request carrying the identity identifier of the user to be bound and the biometric information of the user to be bound, so that the server, in response to the binding request, determines whether the biometric information of the user to be bound and the identity identifier of the user to be bound indicate the same natural person, and in a case that the same natural person is indicated, binds the biometric information of the user to be bound to the electronic signature client, and stores a binding relationship.

In an embodiment, the process of determining whether the biometric information of the user to be bound and the identity identifier of the user to be bound indicate the same natural person may include first sending a verification request to a third-party certification authority, the verification request carrying the biometric information and the identity identifier of the user to be bound, so that the third-party certification authority, in response to the verification request, inquires biometric information corresponding to the identity identifier, and after the biometric information of the user to be bound is matched with the biometric information obtained by the inquiry, returns a result of the matching. After that, it can be determined, according to the result of the matching, whether the biometric information of the user to be bound and the identity identifier of the user to be bound indicate the same natural person.

In an embodiment, the process of publishing the electronic signature to the blockchain for deposit may include encrypting the electronic signature, and further publishing the encrypted electronic signature to the blockchain for deposit.

In an embodiment, the biometric information may be a facial image.

In an embodiment, the electronic signature may include a signature handwriting of the user.

In an embodiment, the electronic signature may further include a signature moment and/or recognized signature content.

A computer device is further provided in the embodiments of the present specification, which includes a processor, and a memory storing instructions executable by the processor, wherein the processor is configured to perform the above blockchain-based electronic signature method applied to the server.

Figure 6:
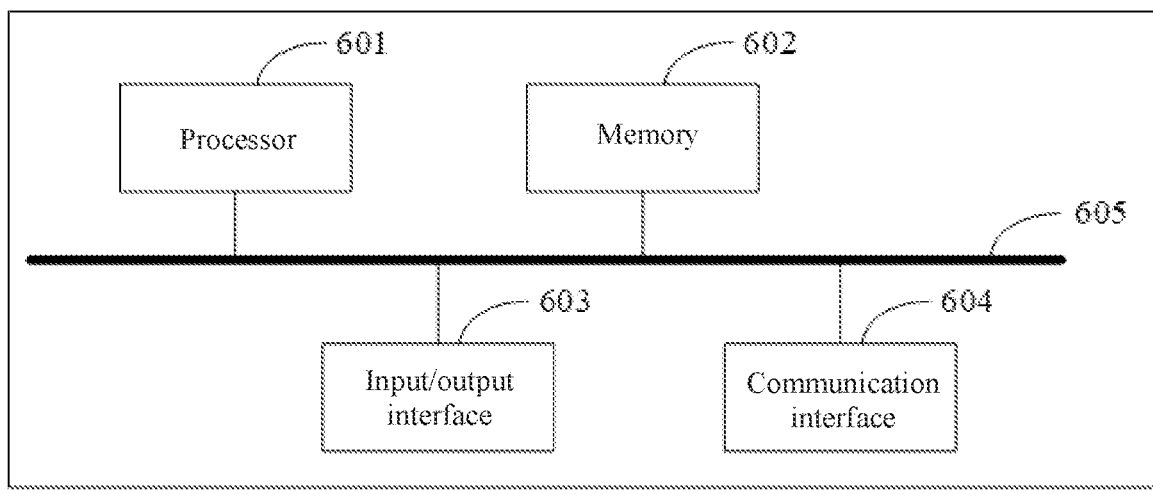
FIG. 6 is a schematic diagram of a server device according to an embodiment.

FIG. 6 is a schematic diagram of a server device according to an embodiment. The device may include: a processor 601, a memory 602, an input/output interface 603, a communication interface 604, and a bus 605. The processor 601, the memory 602, the input/output interface 603, and the communication interface 604 are connected through the bus 605.

The processor 601 may be implemented by a general-purpose Central Processing Unit (CPU), a microprocessor, an Application Specific Integrated Circuit (ASIC), or one or more integrated circuits, and for executing related programs to implement the technical solutions provided by the embodiments of the present specification.

The memory 602 may be implemented by a Read Only Memory (ROM), a Random Access Memory (RAM), a static storage device, a dynamic storage device, etc. Memory 602 may store an operating system and other application programs. When the technical solutions provided by the embodiments of the present specification are implemented by software or firmware, related program code is stored in the memory 602 and is executed by the processor 601.

The input/output interface 603 is configured to be connected to an input/output module to realize information input and output. The input/output module may be configured as a component in the device (not shown), or may also be externally connected to the device to provide corresponding functions. An input device may include a keyboard, a mouse, a touch screen, a microphone, various sensors, etc., and an output device may include a display, a speaker, a vibrator, an indicator light, etc.

The communication interface 604 is configured to be connected to a communication module (not shown) to implement communication interaction between the device and other devices. The communication module may realize communication in a wired mode (such as a USB and a network cable), or in a wireless mode (such as a mobile network, WIFI, and Bluetooth).

The bus 605 includes an access channel and transmits information between all components (such as the processor 601, the memory 602, the input/output interface 603, and the communication interface 604) of the device.

It should be noted that the above device may include more or fewer components than those shown in FIG. 6, which is not limited in the present specification.

A computer device is further provided in the embodiments of the present specification, which includes a processor, and a memory storing instructions executable by the processor, wherein the processor is configured to perform the above blockchain-based electronic signature method applied to an electronic signature client.

Figure 7:
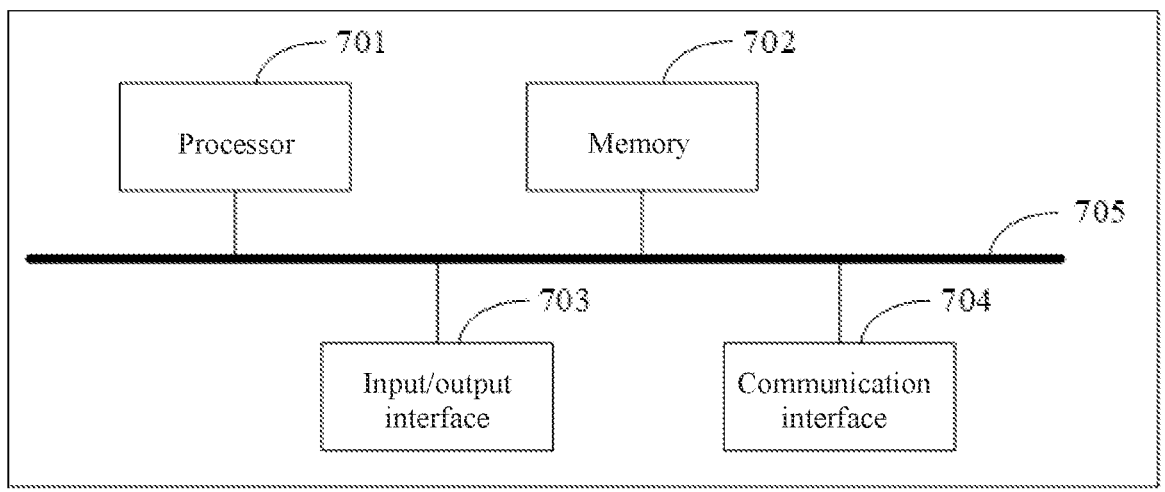
FIG. 7 is a schematic diagram of a client device according to an embodiment.

FIG. 7 is a schematic diagram of a client device according to an embodiment. The device may include: a processor 701, a memory 702, an input/output interface 703, a communication interface 704, and a bus 705. The processor 701, the memory 702, the input/output interface 703, and the communication interface 704 are connected through the bus 705.

The processor 701 may be implemented by a general-purpose Central Processing Unit (CPU), a microprocessor, an Application Specific Integrated Circuit (ASIC), or one or more integrated circuits, and for executing related programs to implement the technical solutions provided by the embodiments of the present specification.

The memory 702 may be implemented by a Read Only Memory (ROM), a Random Access Memory (RAM), a static storage device, a dynamic storage device, etc. Memory 702 may store an operating system and other application programs. When the technical solutions provided by the embodiments of the present specification are implemented by software or firmware, related program code is stored in the memory 702 and is executed by the processor 701.

The input/output interface 703 is configured to be connected to an input/output module to realize information input and output. The input/output module may be configured as a component in the device (not shown), or may also be externally connected to the device to provide corresponding functions. An input device may include a keyboard, a mouse, a touch screen, a microphone, various sensors, etc., and an output device may include a display, a speaker, a vibrator, an indicator light, etc.

The communication interface 704 is configured to be connected to a communication module (not shown) to implement communication interaction between the device and other devices. The communication module may realize communication in a wired mode (such as a USB and a network cable), or in a wireless mode (such as a mobile network, WIFI, and Bluetooth).

The bus 705 includes an access and transmits information between all components (such as the processor 701, the memory 702, the input/output interface 703, and the communication interface 704) of the device.

It should be noted that the above device may include more or fewer components than those shown in FIG. 7, which is not limited in the present specification.

A non-transitory computer-readable storage medium is further provided in the embodiments of the present specification. The storage medium has stored therein instructions that, when executed by a processor of a server device, cause the server device to perform the foregoing blockchain-based electronic signature method.

A non-transitory computer-readable storage medium is further provided in the embodiments of the present specification. The storage medium has stored therein instructions that, when executed by a processor of a client device, cause the client device to performs the foregoing blockchain-based electronic signature method.

The computer-readable medium includes permanent and non-permanent, removable and non-removable media, and can store information by any method or technology. The information may be computer-readable instructions, data structures, program modules, or other data. Examples of computer storage media include, but are not limited to, a phase change memory (PRAM), a static random access memory (SRAM), a dynamic random access memory (DRAM), other types of random access memories (RAM), read-only memories (ROM), electrically erasable programmable read-only memories (EEPROM), flash memories or other memory technologies, read-only compact disc read-only memories (CD-ROM), digital versatile disks (DVD) or other optical storage, magnetic tape cassettes, magnetic tape magnetic disk storage or other magnetic storage devices, or any other non-transmission media, and the computer storage media may be used to store information that may be accessed by computing devices. As defined herein, the computer-readable medium does not include transitory computer readable media (transitory media), such as a modulated data signal and a carrier.

The system, apparatus, module, or device in the above embodiments may be implemented by a computer chip or entity, or implemented by a product having a certain function. An example implementation device is a computer, and the specific form of the computer may be a personal computer, a laptop computer, a cellular phone, a camera phone, a smart phone, a personal digital assistant, a media player, a navigation device, an email sending and receiving device, a game console, a tablet computer, a wearable device, or a combination of any of these devices.

Each module in the apparatus described above may be implemented by software, or hardware, and a combination of software and hardware. The modules described as separate components may or may not be physically separated, and the functions of the modules may be implemented in the same or multiple pieces of software and/or hardware. Part or all of the modules may also be selected according to actual needs.

The foregoing descriptions are merely example embodiments of the present specification and are not intended to limit the present specification. For those skilled in the art, the present specification may have various alterations and changes. Any modification, equivalent replacement, improvement, and the like made within the spirit and principle of the present specification shall be included in the scope of the claims.

The invention claimed is:

1. A blockchain-based electronic signature method, applied to a server, the method comprising:
 receiving an electronic signature authentication request sent by an electronic signature client, wherein the electronic signature client is bound to one or more legal signature users, and the electronic signature authentication request comprises biometric information of a signature user collected by the electronic signature client;
 in response to the electronic signature authentication request, authenticating whether the signature user is a legal signature user bound to the electronic signature client based on the biometric information; and if the signature user is a legal signature user bound to the electronic signature client, returning an authentication result to the electronic signature client, wherein the electronic signature client further prompts the signature user to perform an electronic signature operation in response to the authentication result; and
 receiving an electronic signature submitted by the signature user and collected by the electronic signature client, and publishing the electronic signature to a blockchain.

2. The method according to claim 1, wherein the server stores a biometric information sample of a legal signature user bound to the electronic signature client; and the authenticating whether the signature user is a legal signature user bound to the electronic signature client based on the biometric information comprises:
 matching the biometric information with the biometric information sample stored on the server; and if the matching is successful, determining that the signature user is a legal signature user bound to the electronic signature client.

3. The method according to claim 1, further comprising:
receiving a binding request of the legal signature user sent by the electronic signature client, wherein the binding request comprises an identity identifier of a user to be bound and biometric information of the user to be bound collected by the electronic signature client; and
in response to the binding request, determining whether the biometric information of the user to be bound and the identity identifier of the user to be bound indicate a same natural person; and in a case that the same natural person is indicated, binding the biometric information of the user to be bound to the electronic signature client, and storing a binding relationship.

4. The method according to claim 3, wherein the determining whether the biometric information of the user to be bound and the identity identifier of the user to be bound indicate the same natural person comprises:
sending a verification request to a third-party certification authority, the verification request carrying the biometric information and the identity identifier of the user to be bound, wherein the third-party certification authority, in response to the verification request, inquires biometric information corresponding to the identity identifier, and after the biometric information of the user to be bound is matched with the biometric information obtained by the inquiry, returns a matching result; and
determining whether the biometric information of the user to be bound and the identity identifier of the user to be bound indicate the same natural person according to the matching result.

5. The method according to claim 1, wherein the publishing the electronic signature to the blockchain comprises:
encrypting the electronic signature, and further publishing the encrypted electronic signature to the blockchain.

6. The method according to claim 1, wherein the biometric information is a facial image.

7. The method according to claim 1, wherein the electronic signature comprises a signature handwriting of a user.

8. The method according to claim 7, wherein the electronic signature further comprises at least one of:
a signature time; and
recognized signature content.

9. A blockchain-based electronic signature method, applied to an electronic signature client to which one or more legal signature users are bound; the method comprising:
collecting biometric information of a signature user;
sending an electronic signature authentication request carrying the biometric information to a server, wherein the server, in response to the electronic signature authentication request, authenticates whether the signature user is a legal signature user bound to the electronic signature client based on the biometric information; and if the signature user is a legal signature user bound to the electronic signature client, returns an authentication result to the electronic signature client;
in response to the authentication result, further prompting the signature user to perform an electronic signature operation, and collecting an electronic signature submitted by the signature user; and
sending the electronic signature to the server, for the server to publish the electronic signature to a blockchain.

10. The method according to claim 9, wherein the server stores a biometric information sample of a legal signature user bound to the electronic signature client; and the authenticating whether the signature user is a legal signature user bound to the electronic signature client based on the biometric information comprises:
matching the biometric information with the biometric information sample stored on the server; and if the matching is successful, determining that the signature user is a legal signature user bound to the electronic signature client.

11. The method according to claim 9, further comprising:
collecting biometric information of a user to be bound, and acquiring an identity identifier of the user to be bound; and
sending a binding request of a legal signature user to the server, the binding request carrying the identity identifier of the user to be bound and the biometric information of the user to be bound, wherein the server, in response to the binding request, determines whether the biometric information of the user to be bound and the identity identifier of the user to be bound indicate a same natural person, and in a case that the same natural person is indicated, binds the biometric information of the user to be bound to the electronic signature client, and stores a binding relationship.

12. The method according to claim 11, wherein the determining whether the biometric information of the user to be bound and the identity identifier of the user to be bound indicate the same natural person comprises:
sending a verification request to a third-party certification authority, the verification request carrying the biometric information and the identity identifier of the user to be bound, wherein the third-party certification authority, in response to the verification request, inquires biometric information corresponding to the identity identifier, and after the biometric information of the user to be bound is matched with the biometric information obtained by the inquiry, returns a matching result; and
determining whether the biometric information of the user to be bound and the identity identifier of the user to be bound indicate the same natural person according to the matching result.

13. The method according to claim 9, wherein the publishing the electronic signature to the blockchain comprises:
encrypting the electronic signature, and further publishing the encrypted electronic signature to the blockchain.

14. The method according to claim 9, wherein the biometric information is a facial image.

15. The method according to claim 9, wherein the electronic signature comprises a signature handwriting of a user.

16. The method according to claim 15, wherein the electronic signature further comprises at least one of:
a signature time; and
recognized signature content.

17. A server, comprising:
a processor; and
a memory storing instructions executable by the processor,
wherein the processor is configured to:
receive an electronic signature authentication request sent by an electronic signature client, wherein the electronic signature client is bound to one or more legal signature users, and the electronic signature authentication request comprises biometric information of a signature user collected by the electronic signature client;
in response to the electronic signature authentication request, authenticate whether the signature user is a legal signature user bound to the electronic signature client based on the biometric information; and if the signature user is a legal signature user bound to the electronic signature client, return an authentication result to the electronic signature client, wherein the electronic signature client further prompts the signature user to perform an electronic signature operation in response to the authentication result; and receive an electronic signature submitted by the signature user and collected by the electronic signature client, and publish the electronic signature to a blockchain.

18. An electronic signature client, comprising:

a processor; and a memory storing instructions executable by the processor, wherein the processor is configured to perform the method according to claim 9.

\* \* \* \* \*